United States Patent Office 3,211,763
Patented Oct. 12, 1965

3,211,763
**B-HOMO-STEROIDS AND PROCESS
FOR THEIR MANUFACTURE**
Oskar Jeger, Zollikerberg, Zurich, and Kurt Schaffner, Zurich, Switzerland, assignors to Ciba Corporation, New York, N.Y., a corporation of Delaware
No Drawing. Filed Nov. 27, 1963, Ser. No. 326,374
Claims priority, application Switzerland, Nov. 30, 1962, 14,109/62
22 Claims. (Cl. 260—397.4)

The present invention relates to the manufacture of novel steroids of the 19-nor series containing an extended 7-membered ring B. The new compounds constitute the class of the 3-oxygenated 7α:10α-cyclo-B-homo-19-nor-steroids. Special mention deserve Δ⁴-3-oxo-7α:10α-cyclo-B-homo-19-nor-steroids and 3-oxo-5-alkoxy-7α:10α-cyclo-B-homo-19-nor-steroids.

The compounds referred to above constitute a new class of pharmacologically active steroids or intermediates for the manufacture of steroids. Inter alia, the derivatives of the androstane series containing in 17β-position a free or esterified hydroxyl group, possibly in 17α-position an aliphatic hydrocarbon residue, display a particularly strong anabolic action. The 21-unsubstituted pregnane compounds that contain in position 20 an oxo group act as progestatives, whereas corresponding 21-hydroxy derivatives, which may contain in position 11 an oxo or 11β-hydroxyl group, are distinguished by their anti-inflammatory and anti-allergic effects. The compounds of other steroid series are especially suitable for use as intermediates in the manufacture of the afore-mentioned androstane and pregnane compounds; the conversion into such active compounds can be performed by known methods.

Under the process for the manufacture of the aforesaid new B-homosteroids a 3-oxo-6β:19-cyclosteroid which contains in position 4 a double bond or in position 5 an alkoxy group, is reacted with an acid and, if desired, a resulting Δ⁴-3-oxo-7α:10α-cyclo-B-homo-19-nor-steroid is converted by treatment of an alkanol in the presence of an alkali metal alkanolate into a 3-oxo-5-alkoxy-7α:10α-cyclo-B-homo-19-norsteroid, and/or in the resulting compounds any oxo or hydroxyl groups and/or free or functionally modified hydroxyl and oxo groups if present are converted into each other by known methods.

One example of the reactions of the present process is represented by the following formulae with the use of Δ⁴-3:17-dioxo-6β:19-cycloandrostene or its 5-alkoxy derivative as starting material:

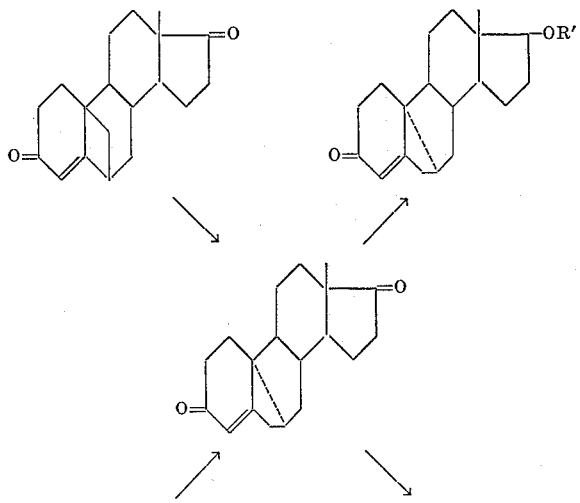

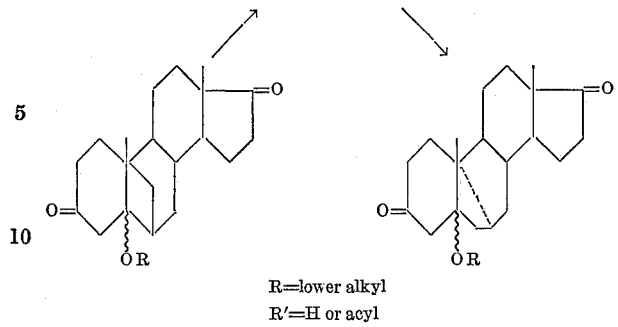

R=lower alkyl
R′=H or acyl

The acid to be used in the present process is more especially an organic carboxylic acid, advantageously a lower aliphatic carboxylic acid, such as formic, acetic, propionic or butyric acid, which at the same time acts as solvent, though it is possible to use alternatively a sulphonic acid, for example para-toluenesulfonic or benzenesulphonic acid, or an inorganic acid, for example a mineral acid such as hydrochloric, sulfuric or perchloric acid, or a Lewis acid of the type of boron trifluoride, tin tetrachloride, zinc chloride or aluminium chloride in a suitable solvent. Such solvents are, for example, aliphatic, alicyclic or aromatic hydrocarbons such as hexane, cyclohexane, benzene or toluene, also lower aliphatic alcohols such as methanol, ethanol, propanol, or butanol and/or ethers, more especially cyclic ethers, for example tetrahydrofuran or dioxane.

The reaction temperature depends on the type of the acid used and ranges preferably from 0° to 120° C.

The conversion according to the invention of a possibly obtained Δ⁴ - 3 - oxo - 7α:10α - cyclo - B - homo-19 - norsteroid into the corresponding 4:5 - saturated 5-alkoxy compound is advantageously performed by reacting it with a lower alkanol such as methanol, ethanol, propanol or butanol, in the presence of an alkali metal alkanolate, for example of the methylate, ethylate, propylate or butylate of sodium, potassium or lithium. The conversion is preferably performed at the boiling point of the alcohol selected.

If desired, the resulting 5 - alkoxy compounds may be reconverted into the corresponding Δ⁴- 3 - oxo - 7α:10α - cyclo - B - homo - 19 - norsteroids, for example by heating with one of the aforesaid acids.

The conversion of hydroxyl and oxo groups present in the products of the present process into each other follows the usual practice. Of special importance with regard to the manufacture of the above-mentioned pharmacologically active products is the reduction of a 17-oxo group into the 17β-hydroxyl group; this may be achieved either selectively, for example by treatment with a mild reducing agent such as a complex metal hydride of the type of the lithium trialkoxy aluminium hydrides such as lithium triethoxy aluminium hydride or lithium tri - tertiary butoxy aluminium hydride or with simultaneous reduction of the 3-oxo group, for example by means of lithium aluminium hydride. In the latter case it is of advantage to follow up with a selective oxidation of the 3-hydroxyl group, for example with manganese dioxide or N - bromosuccinimide, or according to Oppenauer. The Oppenauer oxidation is preferably performed as described in Belgian specification No. 589,910. The reduction of a 17-oxo group present may also be performed, if desired after ketalization of a 3-oxo group, with a metal derivative of an aliphatic hydrocarbon, such as a Grignard or an alkali metal derivative.

As starting materials for use in the present process there are suitable Δ⁴ - 3 - oxo - 6β:19 - cyclosteroids and 3 - oxo - 5 - alkoxy - 6β:19 - cyclosteroids, more especially representatives of the androstane, pregnane, cholane, cholestane, spirostane and cardanolide series. In addition to the aforesaid groupings they may contain in one or more than one of positions 2, 4, 7, 8, 9, 11, 12, 14–17, 20, 21 and in the side chain further substituents, such as alkyl, for example methyl groups halogen atoms and/or free, esterified or etherified hydroxyl groups. Moreover, they may contain in one or more than one of positions 11, 12, 15, 16, 17, and 20 a possibly converted oxo group, and in positions 14, 15, 16, 17 and in the side chain additional double bonds.

Particularly valuable starting materials are those which correspond to the general Formulae I and II

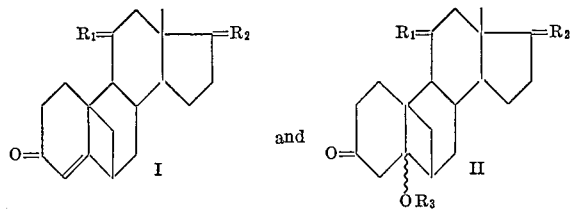

in which $R_1$ represents two hydrogen atoms, an oxo group or a hydrogen atom together with a free or esterified hydroxyl group, $R_2$ represents an oxo group, or a free or esterified β-hydroxyl group together with a hydrogen atom or with a saturated or unsaturated aliphatic hydrocarbon residue, more especially a methyl group, or a β-positioned acetyl or free or esterified hydroxyacetyl group together with a hydrogen atom or with a free or esterified hydroxyl group, and $R_3$ represents a lower alkyl group.

Specific starting materials are, for example: $\Delta^4$ - 3-oxo-6β:19-cyclocholestene and -spirostene, $\Delta^4$-3:17-dioxo-6β:19 - cycloandrostene, $\Delta^4$ - 3 - oxo - 17β - hydroxy-6β:19 - cycloandrostene, $\Delta^4$ - 3 - oxo - 17β - hydroxy-17α - alkyl-, -alkenyl- or -alkinyl - 6β:19 - cycloandrostenes, such as $\Delta^4$ - 3 - oxo - 17β - hydroxy - 17α-methyl-, -ethyl-, -allyl-, -vinyl-, -ethinyl - or -propinyl-6β:19 - cycloandrostene, $\Delta^4$ - 3:20 - dioxo - 6β:19-cyclopregnene, $\Delta^4$ - 3:20 - dioxo -17α - hydroxy - 6β:19 - cyclopregnene, and their corresponding 3 - oxo - 5-alkoxy derivatives, saturated in ring A, for example 3:17-dioxo - 5 - ethoxy - 6β:19 - cycloandrostane, 3 - oxo - 5-methoxy - 17β - hydroxy - 6β:19 - cycloandrostane, 3-oxo - 5 - methoxy - 17β - hydroxy - 17α - methyl - 6β:19 - cycloandrostane, 3:20 - dioxo - 5 - methoxy - 6β:19-cyclopregnane and 3:20 - dioxo - 5 - methoxy - 17α-hydroxy - 6β:19 - cyclopregnane and the esters of the hydroxy compounds mentioned, especially the acetates thereof.

The afore-mentioned starting materials are advantageously prepared from $\Delta^4$-3-oxo-19-hydroxysteroids by conversion in known manner into the corresponding 19-mesylates and heating the latter in an aliphatic alcohol, such as methanol, with an alkali metal alcoholate, such as sodium methylate. Under the said conditions there results a mixture of the $\Delta^4$-3-oxo-and 3-oxo-5-alkoxy-6β:19-cyclosteroids which is preferably separated by crystallisation or chromatography. The two components can be converted into each other. Thus, for example, renewed heating of a $\Delta^4$-3-oxo-6β:19-cyclosteroid with an alkali metal alkanolate in the corresponding alkanol furnishes a good yield of 3-oxo-5-alkoxy-6β:19-cyclosteroid which is then converted, for example by being heated with an alkali metal hydroxide, such as potassium or sodium hydroxide, in an aqueous alcohol, for example in methanol of 90% strength, partially into the $\Delta^4$-3-oxo-6β:19-cyclo compound.

The new B-homosteroids obtained by the present process from the aforementioned particularly valuable starting materials are those of the Formulae III and IV:

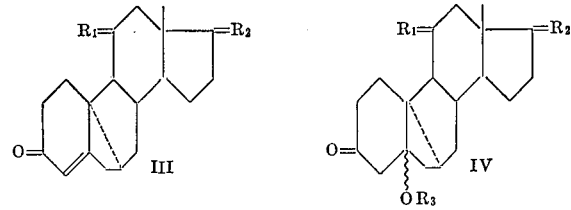

in which $R_1$ to $R_3$ have the above given meanings.

More especially, the following products of the present process may be mentioned:

$\Delta^4$ - 3:17 - dioxo - 7α:10α - cyclo - B - homo - 19 - norandrostene, $\Delta^4$ - 3 - oxo - 17β - hydroxy - 7α:10α - cyclo - B - homo - 19 - norandrostene, $\Delta^4$ - 3 - oxo - 17β-hydroxy - 17α - alkyl-, -alkenyl- or -alkinyl- -7α:10α-cyclo - B - homo - 19 - norandrostenes such as $\Delta^4$ - 3 - oxo-17β-hydroxy-17α-methyl-, -ethyl-, -vinyl-, -allyl- or -ethinyl - 7α:10α - cyclo - B - homo - 19 - norandrostene, $\Delta^4$ - 3:20 - dioxo - 7α:10α - cyclo - B - homo - 19 - norpregnene, $\Delta^4$ - 3:20 - dioxo - 17α - hydroxy - 7α:10α-cyclo - B - homo - 19 - norpregnene, and the corresponding 3 - oxo - 5 - alkoxy - 7α:10α - cyclo - B - homo - 19-norsteroids saturated in ring A, for example 3:17-dioxo-5 - methoxy - 7α:10α - cyclo - B - homo - 19 - norandrostane, 3 - oxo - 5 - methoxy - 17β - hydroxy - 7α:10α - cyclo - B - homo - 19 - norandrostane, 3 - oxo - 5-methoxy - 17β - hydroxy - 17β - methyl -, -ethyl -, - vinyl -, -allyl - or -ethinyl - 7α:10α - cyclo - B - homo - 19 - norandrostane, 3:30 - dioxo - 5 - methoxy - or -ethoxy-7α:10α - cyclo - B - homo - 19 - norpregnane and 3:20 - dioxo - 5 - methoxy - 17α - hydroxy - 7α:10α - cyclo-B - homo - 19 - norpregnane and the esters of the said hydroxy compounds, especially the acetates thereof, The present invention includes also the new 3-oxo-5-alkoxy-, for example -5-methoxy-6β:19-cyclosteroids used as starting materials, more especially those of the androstane and pregnane series, of the above general Formula II.

The acid residues in the esters are more especially those of aliphatic, cycloaliphatic, araliphatic, aromatic or heterocyclic carboxylic acids with 1 to 15 carbon atoms, for example those of the above mentioned carboxylic acids.

The new compounds can be used as medicaments in the form of pharmaceutical preparations containing them in conjunction or admixture with organic or inorganic, solid or liquid, pharmaceutical excipients suitable for enteral (for example oral) or parenteral administration Suitable excipients are substances that do not react with the new compounds, for example water, gelatine, lactose, starches, magnesisum stearate, talcum, vegetable oils, benzyl alcohols, gums, polyalkyleneglycols, cholesterol or other known medicinal excipients. The pharmaceutical preparations may be in the form of tablets, pills or capsules, or in liquid form as solutions, suspensions or emulsions. They may be sterilised and/or may contain assistants such as preserving, stabilising, wetting or emulsifying agents, salts for regulating the osmotic pressure or buffers.

The following examples illustrate the invention. The ultraviolet spectra were measured in reactified alcohol and the infrared spectra in chloroform. The optical rotations were measured in chloroform solutions.

*Example 1*

A solution of 510 mg. of $\Delta^4$-3:17-dioxo-6β:19-cycloandrostene in 90 ml. of glacial acetic acid is heated for 2 hours at the boil, then evaporated and the residue is crstallised from acetone+petroleum ether, to yield 388 mg. of $\Delta^4$-3:17-dioxo-7α:10α-cyclo-B-homo-19-norandrostene melting at 163–164° C. Optical rotation $[\alpha]_D = +285°$ (c.=0.77). Ultraviolet spectrum:

$$\lambda_{max} = 253\ m\mu\ (\epsilon = 11780)$$

Infrared spectrum: $\nu_{max} = 1735, 1659\ cm.^{-1}$.

The starting material can be obtained as follows:

A mixture of 3.0 g. of Δ⁴-3:17-dioxo-19-mesyloxyandrostene, 6.0 g. of sodium methylate and 275 ml. of methanol is heated for 2 hours at the boil. The reaction solution is taken up in ether and worked up in the usual manner, to yield 2.430 g. of an amorphous mixture which is chromatographed on neutral alumina (activity II).

A 1:1-mixture of petroleum ether and benzene elutes 652 mg. of crystalline 3:17-dioxo-5-methoxy-6β:19-cycloandrostane melting at 135° C. (after three recrystallisations from acetone+petroleum ether). Optical rotation $[\alpha]_D = +77°$ (c.=0.59). Infrared spectrum: $\nu_{max}=1730$, 1708 cm.$^{-1}$. Ultraviolet spectrum: $\lambda_{max}=242$, 292 mμ ($\epsilon=269.84$), final absorption at 210 mμ ($\epsilon=845$).

Subsequent petroleum ether+benzene (1:1) and benzene fractions contain 1.720 g. of crystalline Δ⁴-3:17-dioxo-6β:19-cycloandrostene melting at 132° C. (after two recrystallisations from ether+petroleum ether). Optical rotation $[\alpha]_D = -73°$ (c.=0.83). Ultraviolet spectrum: $\lambda_{max}=244$ mμ ($\epsilon=15460$).

A mixture of 560 mg. of 3:17-dioxo-5-methoxy-6β:19-cycloandrostane, 100 ml. of methanol of 90% strength and 5 g. of caustic potash is heated for 2 hours at the boil. The reaction solution is worked up in the usual manner and evaporated, to yield 438 mg. of amorphous material which is chromatographed on neutral alumina (activity II).

With a 1:1-mixture of petroleum ether and benzene 135 mg. of unreacted starting material are recovered.

On addition of ether there are then obtained 137 mg. of Δ⁴-3:17-dioxo-6β:19-cycloandrostene which, after recrystallisation from acetone+petroleum ether, melts at 131–132° C. According to the mixed melting point and the infrared spectrum it is identical with the above mentioned product.

*Example 2*

A solution of 2.80 g. of 3:17-dioxo-5-methoxy-6β:19-cycloandrostane in 150 ml. of glacial acetic acid is heated for 2 hours at the boil and then evaporated. Crystallisation of the residue from acetone+petroleum ether yields 2.194 g. of Δ⁴-3:17-dioxo-7α:10α-cyclo-B-homo-19-norandrostene melting at 158–161° C. According to the mixed melting point and the infrared spectrum it is identical with the final product of Example 1.

The starting material may be prepared as follows:

A mixture of 500 mg. of Δ⁴-3:17-dioxo-6β:19-cycloandrostene, 150 ml. of methanol and 1 g. of sodium methylate is heated for 12 hours at the boil, then evaporated to dryness under vacuum and worked up. Chromatography of the crude product (490 mg.) on neutral alumina (activity II; 14 g.) yields 166 mg. of crystalline 3:17-dioxo-5-methoxy-6β:19-cycloandrostane which, after recrystallisation from acetone+petroleum ether, melts at 135° C. It is identical with the product mentioned in Example 1. On addition of ether, 289 mg. of unreacted starting material are recovered.

*Example 3*

85 mg. of Δ⁴-3:17-dioxo-7α:10α-cyclo-B-homo-19-norandrostene are treated in 10 ml. of boiling methanol for 2 hours with 180 mg. of sodium methylate. The crude product obtained by working up is dissolved in ether and filtered through neutral alumina (activity III; 87 mg.). Two recrystallisations from acetone+petroleum ether furnish 3:17-dioxo-5-methoxy-7α:10α-cyclo-B-homo-19-norandrostane melting at 148–149° C. Optical rotation $[\alpha]_D = +160°$ (c.=0.53). Infrared spectrum: $\nu_{max}=1730$, 1710 cm.$^{-1}$.

*Example 4*

A solution of 530 mg. of 3:17-dioxo-5-methoxy-7α:10α-cyclo-B-homo-19-norandrostane in 100 ml of glacial acetic acid is heated for 2 hours at the boil and then evaporated. Two recrystallisations of the residue (449 mg.) from acetone+petroleum ether furnish 352 mg. of Δ⁴-3:17-dioxo-7α:10α-cyclo-B-homo-19-norandrostene melting at 160–161° C.

*Example 5*

According to the method described in Example 1, 500 mg. of Δ⁴-3-oxo-17β-hydroxy-6β:19-cyclo-androstene or Δ⁴-3-oxo-17β-acetoxy-6β:19-cycloandrostene yield 300 to 400 mg. of pure Δ⁴-3-oxo-17β-hydroxy-7α:10α-cyclo-B-homo-19-norandrostene; M.P. 171° C., optical rotation $[\alpha]_D=240°$ (c.=0.87) or its 17-acetate repectively, M.P. 125° C., optical rotation $[\alpha]_D= +186°$ (c.=1.12). The ultraviolet and infrared spectra of these compounds are in keeping with the expected data.

The starting material may be obtained as follows:

A solution of 1.0 g. of Δ⁴-3:17-dioxo-6β:19-cycloandrostene in 30 ml. of tetrahydrofuran is stirred dropwise at 0° C. into a suspension of 1.50 g. of lithium tri-tertiary butoxy aluminium hydride in 10 ml. of tetrahydrofuran. After a reaction time of 40 minutes at 0° C., 10 ml. of acetic acid of 5% strength are added, and the whole is worked up, to yield 985 mg. of crystalline Δ⁴-3-oxo-17β-hydroxy-6β:19-cycloandrostene which, after two recrystallisations for acetone:petroleum ether, melts at 125–126° C. Optical rotation $[\alpha]_D=-160°$ (c.=0.89). Ultraviolet spectrum: $\lambda_{max}=245$ mμ ($\epsilon=14500$). Ultraviolet spectrum: $\nu_{max}=3620$, 1655 cm.$^{-1}$.

A mixture of 100 mg. of Δ⁴-3-oxo-17β-hydroxy-6β:19-cycloandrostene, 10 ml. of pyridine and 10 ml. of acetic anhydride is allowed to stand overnight at room temperature. After evaporation the crude product is dissolved in benzene and filtered through neutral alumina (activity III). Two recrystallisations from ether+heptane yield Δ⁴-3-oxo-17β-acetoxy-6β:19-cycloandrostene melting at 147–148° C. Optical rotation $[\alpha]_D=138°$ (c.=0.75). Ultraviolet spectrum: $\lambda_{max}=245$ mμ ($\epsilon=13980$). Infrared spectrum: $\mu_{max}=1725$, 1660 and 1260 cm.$^{-1}$.

*Example 6*

In the manner described in Example 1 Δ⁴-3-oxo-17β-hydroxy-17α-methyl-6β:19-cycloandrostene [prepared from 19-hydroxy-17α-methyltestosterone-17-O-acetate via the 19-mesylate by treatment with sodium methylate] gives a yield of 50 to 60% of Δ⁴-3-oxo-17β-hydroxy-17α-methyl-7α:10α-cyclo-B-homo-19-norandrostene.

*Example 7*

1.25 g. of crude Δ⁴-3:20-dioxo-17α-acetoxy-6β:19-cyclopregnene is dissolved in 200 ml. of glacial acetic acid and refluxed for 2 hours. The acetic acid is then evaporated under vacuum, and there are obtained 1.24 g. of crude Δ⁴-3:30-dioxo-17α-acetoxy-7α:10α-cyclo-B-homo-19-norpregnene which on chromatographic purification yields 710 mg. of the pure crystalline compound. The starting material can be obtained as follows:

2.5 g. of Δ⁴-3:20-dioxo-17α-acetoxy-19-hydroxypregnene are converted with excess methanesulphonylchloride in pyridine at 0° C. into Δ⁴-3:20-dioxo-17α-acetoxy-19-mesyloxypregnene. The latter product is refluxed for 2 hours with 6.0 g. of sodium ethylate in 300 ml. of ethanol and the reaction mixture worked up. The starting crude product (2.45 g.) is separated by chromatography on neutral alumina, to yield—in addition to 500 mg. of 3:20-dioxo-5-ethoxy-17α-acetoxy-6β:19-cyclopregnene—1.25 g. of crude Δ⁴-3:20-dioxo-17α-acetoxy-6β:19-cyclopregnene.

*Example 8*

When 820 mg. of Δ⁴-3:17-dioxo-7α:10α-cyclo-B-homo-19-norandrostene are reacted with lithium tri-tertiary butoxy aluminium hydride as described in Example 5, there is obtained a yield of about 80% of Δ⁴-3-oxo-17β-hydroxy-7α:10α-cyclo-B-homo-19-norandrostene which, on acetylation with acetic anhydride in pyridine, furnishes Δ⁴-3-oxo-17β-acetoxy-7α:10α-cyclo-B-homo - 19 - norandrostene. These compounds are in every respect identical with the final products described in Example 5.

What is claimed is:

1. A member selected from the group consisting of compounds of the formulae

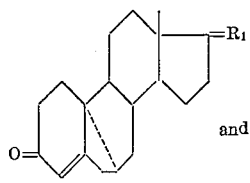 and 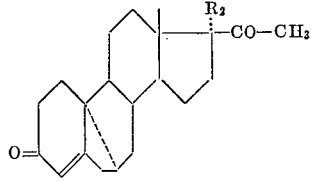

wherein R₁ is a member selected from the group consisting of =O, —OH, —OAc,

and R₂ is a member selected from the group consisting of ...OH and ...OAc, R representing a lower aliphatic hydrocarbon radical and Ac representing an acyl radical selected from the group consisting of radicals derived from aliphatic, cycloaliphatic, araliphatic, aromatic and heterocyclic acids with 1 to 15 carbon atoms.

2. A member selected from the group consisting of compounds of the formulae

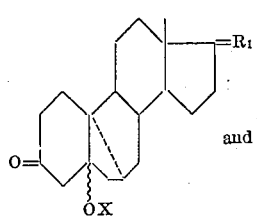 and 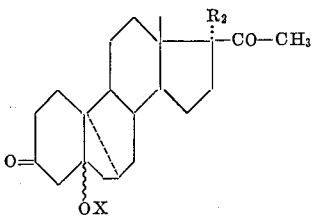

wherein R₁ is a member selected from the group consisting of =O, —OH, —OAc,

R₂ is a member selected from the group consisting of ...OH and ...OAc, R representing a lower aliphatic hydrocarbon radical, Ac representing an acyl radical selected from the group consisting of radicals derived from aliphatic, cycloaliphatic, araliphatic, aromatic and heterocyclic acids with 1 to 15 carbon atoms, and X is a lower alkyl group.

3. A member selected from the group consisting of compounds of the formulae

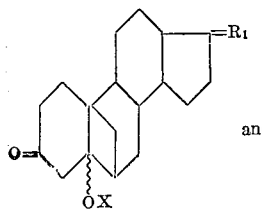 and 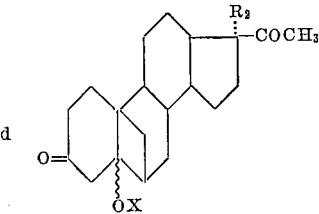

wherein R₁ is a member selected from the group consisting of =O, —OH, —OAc,

R₂ is a member selected from the group consisting of ...OH and ...OAc, R representing a lower aliphatic hydrocarbon radical, Ac representing an acyl radical selected from the group consisting of radicals derived from aliphatic, cycloaliphatic, araliphatic, aromatic and heterocylic acids with 1 to 15 carbon atoms, and X is a lower alkyl group.

4. Δ⁴-3:17-dioxo-7α:10α-cyclo-B-homo - 19 - norandrostene.

5. A member selected from the group consisting of Δ⁴-3-oxo-17β-hydroxy-7α:10α-cyclo-B-homo - 19 - norandrostene and its esters of carboxylic acids having up to 15 carbon atoms.

6. Δ⁴-3-oxo-17β-acetoxy-7α:10α - cyclo - B - homo - 19-norandrostene.

7. A member selected from the group consisting of Δ⁴-3-oxo-17β-hydroxy-17α-methyl-7α:10α-cyclo-B - homo-19-norandrostene and its esters of carboxylic acids having up to 15 carbon atoms.

8. Δ⁴-3:20 - dioxo - 7α:10α - cyclo - B - homo - 19-norpregnene.

9. Δ⁴-3:20-dioxo-17α-acetoxy-7α:10α-cyclo - B - homo-19-norpregnene.

10. 3:17-dioxo-5-methoxy-6β:19-cycloandrostene.

11. 3:17-dioxo-5-ethoxy-6β:19-cycloandrostane.

12. A member selected from the group consisting of 3-oxo-5-methoxy-17β-hydroxy-6β:19-cycloandrostane and its esters of carboxylic acids having up to 15 carbon atoms.

13. A member selected from the group consisting of 3-oxo-5-methoxy-17β-hydroxy-17α-methyl-6β:19-cycloandrostane and its esters of carboxylic acids having up to 15 carbon atoms.

14. 3:20-dioxo-5-methoxy-6β:19-cyclopregnane.

15. 3:20-dioxo-5-methoxy-17α-acetoxy - 6β:19 - cyclopregnane.

16. Process for the manufacture of 3-oxygenated 7α:10α-cyclo-B-homo-19-norsteroids, wherein a 3-oxo-6β:19-cyclosteroid which contains a member selected from the group consisting of a 4 (5)-double bond and a 5-alkoxy group, is reacted with an acid.

17. Process according to claim 16, wherein a resulting Δ⁴-3-oxo-7α:10α-cyclo-B-homo-19-norsteroid is converted by treatment of an alkanol in the presence of an alkali metal alkanolate into a 3-oxo-5-alkoxy-7α:10α-cyclo-B-homo-19-norsteroid.

18. Process as claimed in claim 16, wherein an organic carboxylic acid is used.

19. Process as claimed in claim 16, wherein a lower aliphatic carboxylic acid is used.

20. Process as claimed in claim 16, wherein acetic acid is used.

21. Process as claimed in claim 16, wherein a member selected from the group consisting of a sulfonic acid and an inorganic acid is used.

22. Process as claimed in claim 17, wherein methanol and sodium methylate are used.

References Cited by the Examiner

Bonet et al.: Helv. Chim. Acta, 46, pages 1776–1779, August 1963.

LEWIS GOTTS, *Primary Examiner.*